H. C. HUBBELL.
STORAGE BATTERY ELECTRODE AND PROCESS OF MAKING SAME.
APPLICATION FILED JUNE 7, 1911.

1,086,666.  Patented Feb. 10, 1914.

UNITED STATES PATENT OFFICE.

HARRY CROSS HUBBELL, OF NEWARK, NEW JERSEY.

STORAGE-BATTERY ELECTRODE AND PROCESS OF MAKING SAME.

1,086,666. Specification of Letters Patent. Patented Feb. 10, 1914.

Application filed June 7, 1911. Serial No. 631,763.

*To all whom it may concern:*

Be it known that I, HARRY CROSS HUBBELL, a citizen of the United States, residing at Newark, in the county of Essex and State of New Jersey, have invented certain new and useful Improvements in Storage-Battery Electrodes and Processes of Making Same, of which the following is a specification.

My present invention relates to an improved storage battery electrode, being specifically, a plate of special construction wherein oxygen compounds of iron are the active material.

It further relates to the process for making said plate.

Figure 1:
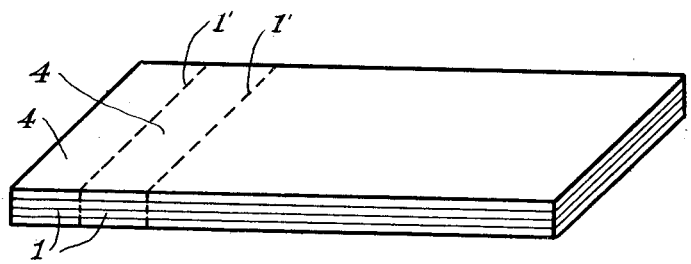
Figure 2:
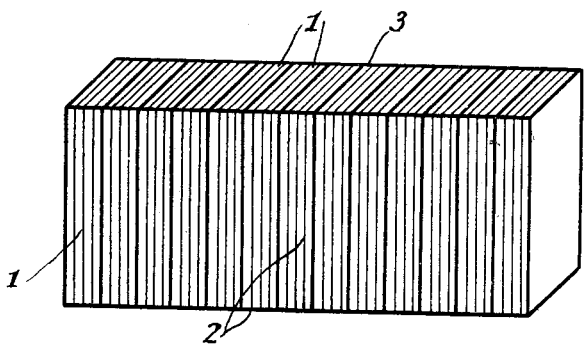

In the drawings, Figure 1 shows a plate consisting of alternate layers of different metals; and Fig. 2 shows this plate after it has been cut up into bars 1, as along the lines 1' of Fig. 1, and after these bars have been rearranged to form a storage battery plate wherein the layers are disposed edgewise to the faces 2 and 3 of the plate, that is, in Fig. 2 the surfaces 4—4 are placed in abutment.

I will now describe my improved electrode-plate and the process for its manufacture, reserving it to the claims to point out the novel features and to define the scope of the invention, it being understood that the claims will be interpreted to have the due range of equivalents to which they may be entitled in view of the art.

I will first describe the process of making the electrode wherein I start with a sheet made up in any preferred manner of alternate layers of iron and cadmium, the layers being preferably of film-like thickness. An obvious way of making the sheet will be by successive electro-depositions of the metals until the desired aggregate thickness for the sheet is reached. I then cut up this sheet into bars which I then arrange side by side in the shape of the finished electrode-plate, with the layers of the bars directed edgewise to the faces of said plate. Each set of ends of the bars are then integrally united, preferably by fusing them with an oxy-hydrogen or acetylene flame so that each set of ends are in perfect electrical connection along the side edges of the plate. Another method of uniting the bars is by binding them together in a surrounding frame of a suitable metal, such as iron or nickel. Here again, however, the ends of the bars are preferably fused to said frame to insure perfect electrical connection. A convenient size for the electrode-plate is about one inch by five inches by three-sixteenths of an inch thick.

The mechanical features of obtaining the so-called bars from the sheet and their assembling into a plate with their layers disposed edgewise to the faces thereof are the same as illustrated in the drawings and in my co-pending United States application, Serial No. 631,271, filed June 5, 1911. I now may proceed in different ways. Thus I may distil out the cadmium layers by heating the plate, preferably in a gas which is inert to cadmium such as hydrogen, leaving the iron which I may then superficially form with electrolytically active oxid by making the plate an anode in a dilute solution of phenol containing alkaline phenolate or some other suitable electrolyte, such as a dilute alkaline solution of sodium chlorid, sulfate, nitrate, etc. As an alternative to the above distilling step, I may electrolytically dissolve out the cadmium layers by making the plate an anode in a suitable electrolyte, which will take out the cadmium without removing the iron. In any event the resulting plate consists of numerous thin strips of iron arranged in close face to face parallelism disposed edgewise to the superficies of the plate and separated by intermediate layers of electrolytically active iron oxygen compounds.

In the above process I may start with a sheet consisting of layers of iron alternating (instead of cadmium) with layers of zinc or tin or equivalent metals under the conditions. These zinc or tin layers I then dissolve out of the assembled bars to leave the iron strips by making the plate an anode in an alkaline electrolyte, preparatory to replacing said layers with the iron active material.

What I claim is:

1. A storage battery electrode comprising a plate consisting of numerous thin strips of iron arranged in close face to face parallelism disposed edgewise to the faces of the plate and being separated by intermediate layers of electrolytically active iron oxygen compounds.

2. A storage battery electrode comprising a plate consisting of numerous thin strips of iron arranged in close face to face parallelism disposed edgewise to the faces of the plate and being superficially formed with electrolytically active iron oxygen compounds.

3. The process of making a storage battery electrode which comprises uniting into a plate alternate layers of iron and of a cadmium-like metal with the layers disposed edgewise to the faces of the plate, removing the cadmium-like layers, and forming the iron layers with electrolytically active oxygen compounds.

4. The process of making a storage battery electrode which comprises uniting into a plate alternate layers of iron and of a cadmium-like metal with the layers disposed edgewise to the faces of the plate, removing the cadmium-like layers, and forming the iron layers with electrolytically active oxygen compounds by making the plate an anode in an aqueous solution of phenol containing alkaline phenolate.

5. The process of making a storage battery electrode which comprises uniting into a plate alternate of iron and of cadmium with the layers disposed edgewise to the faces of the plate, distilling out the cadmium layers, and forming the iron layers with electrolytically active iron oxygen compounds.

In testimony whereof I have affixed my signature in presence of two witnesses.

HARRY CROSS HUBBELL.

Witnesses:
E. W. SCHERR, Jr.,
ALAN C. MCDONNELL.